United States Patent
Kawahito

(10) Patent No.: US 7,889,253 B2
(45) Date of Patent: Feb. 15, 2011

(54) WIDE DYNAMIC RANGE IMAGE SENSOR

(75) Inventor: Shoji Kawahito, Hamamatsu (JP)

(73) Assignee: National University Corporation Shizuoka University, Shizuoka-shi, Shizuoka (JP)

( * ) Notice: Subject to any disclaimer, the term of this patent is extended or adjusted under 35 U.S.C. 154(b) by 551 days.

(21) Appl. No.: 10/558,755

(22) PCT Filed: May 31, 2004

(86) PCT No.: PCT/JP2004/007869

§ 371 (c)(1),
(2), (4) Date: Dec. 22, 2006

(87) PCT Pub. No.: WO2004/110057

PCT Pub. Date: Dec. 16, 2004

(65) Prior Publication Data

US 2007/0103569 A1    May 10, 2007

(30) Foreign Application Priority Data

Jun. 2, 2003    (JP) .............................. 2003-156301

(51) Int. Cl.
  *H04N 3/14*    (2006.01)
  *H04N 5/335*   (2006.01)
(52) U.S. Cl. ...................................... 348/297; 348/296
(58) Field of Classification Search ............. 348/230.1, 348/255, 297, 298, 305, 315, 316, 323, 367
   See application file for complete search history.

(56) References Cited

U.S. PATENT DOCUMENTS

| | | | | |
|---|---|---|---|---|
| 4,837,630 | A * | 6/1989 | Ueda | 348/319 |
| 5,712,682 | A * | 1/1998 | Hannah | 348/255 |
| 6,674,475 | B1 * | 1/2004 | Anderson | 348/367 |
| 6,927,793 | B1 * | 8/2005 | Seitz et al. | 348/230.1 |
| 2001/0040632 | A1 * | 11/2001 | Yang et al. | 348/294 |
| 2002/0027606 | A1 * | 3/2002 | Yadid-Pecht | 348/298 |

(Continued)

FOREIGN PATENT DOCUMENTS

JP    1-274580    11/1989

(Continued)

OTHER PUBLICATIONS

Notice of Allowance issued Sep. 15, 2009 in corresponding Japanese Patent Application 2003-156301.

*Primary Examiner*—Sinh Tran
*Assistant Examiner*—Jason A Flohre
(74) *Attorney, Agent, or Firm*—Westerman, Hattori, Daniels & Adrian, LLP

(57) ABSTRACT

The present invention relates to a CMOS image sensor having a wide dynamic range, which permits favorable imaging even in cases where a bright portion and a dark portion exist simultaneously.

The dynamic range can be widened by preventing the saturation of optical charge at a high illuminance by removing low illuminance signals due to long-time accumulation, intermediate illuminance signals due to short-time accumulation, and high illuminance signals due to ultra-short time accumulation from pixel portions of the image sensor. Further, adaptive control of the dynamic range can also be performed by dynamically changing the wide dynamic range imaging conditions that comprise a combination of different accumulation times of each of a plurality of short time accumulation signals.

1 Claim, 13 Drawing Sheets

U.S. PATENT DOCUMENTS

2002/0134918 A1* 9/2002 Miida ................... 250/214.1
2003/0184673 A1* 10/2003 Skow ..................... 348/364
2005/0243177 A1* 11/2005 Kang et al. ............. 348/207.1

FOREIGN PATENT DOCUMENTS

| JP | 4-317279 | 11/1992 |
| JP | 5-161078 | 6/1993 |
| JP | 05-316413 A | 11/1993 |
| JP | 6-217206 | 8/1994 |
| JP | 9-181986 | 7/1997 |
| JP | 10-173988 A | 6/1998 |
| JP | 2001-346096 | 12/2001 |
| JP | 2002-334326 | 11/2002 |

* cited by examiner

Fig.1
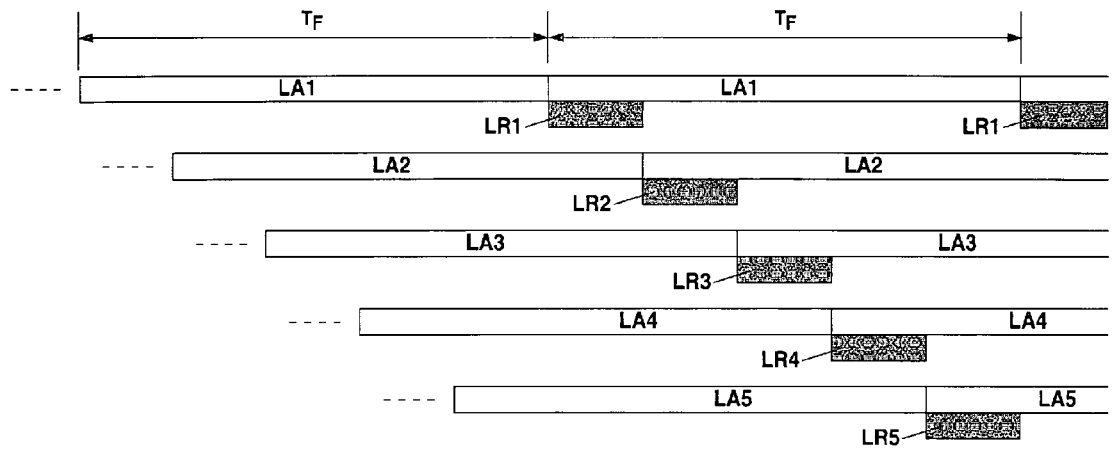
(a)
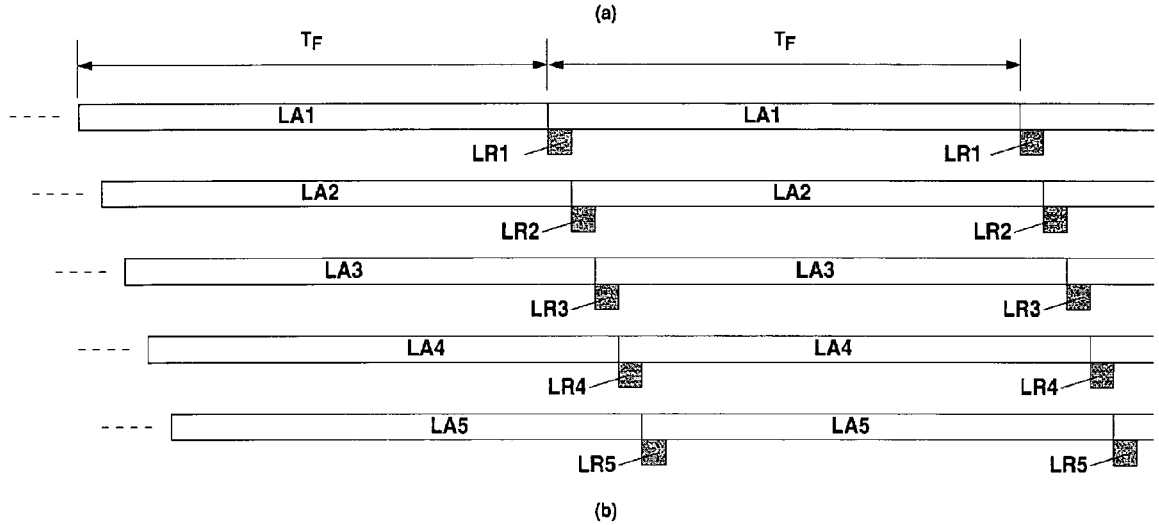
(b)
PRIOR ART

Fig.7

|  | LA | SA1 | SA2 | SA3 | Dynamic range(G=1) | Dynamic range(G=4) |
|---|---|---|---|---|---|---|
| $S_0$ | $T_F$ | – | – | – | $D_0$ | $D_0'$ |
| $S_1$ | $(5/6)T_F$ | x(1/5) | – | – | $D_0 \times 5 \times (5/6)$ | $D_0' \times 4 \times 5 \times (5/6)$ |
| $S_2$ | $(5/6)T_F$ | x(1/10) | – | – | $D_0 \times 10 \times (5/6)$ | $D_0' \times 4 \times 10 \times (5/6)$ |
| $S_3$ | $(5/6)T_F$ | x(1/20) | – | – | $D_0 \times 20 \times (5/6)$ | $D_0' \times 4 \times 20 \times (5/6)$ |
| $S_4$ | $(2/3)T_F$ | x(1/8) | x(1/4) | – | $D_0 \times 32 \times (2/3)$ | $D_0' \times 4 \times 32 \times (2/3)$ |
| $S_5$ | $(2/3)T_F$ | x(1/8) | x(1/8) | – | $D_0 \times 64 \times (2/3)$ | $D_0' \times 4 \times 64 \times (2/3)$ |
| $S_6$ | $(2/3)T_F$ | x(1/8) | x(1/16) | – | $D_0 \times 128 \times (2/3)$ | $D_0' \times 4 \times 128 \times (2/3)$ |
| $S_7$ | $(1/2)T_F$ | x(1/6) | x(1/8) | x(1/6) | $D_0 \times 288 \times (1/2)$ | $D_0' \times 4 \times 288 \times (1/2)$ |
| $S_8$ | $(1/2)T_F$ | x(1/6) | x(1/8) | x(1/16) | $D_0 \times 768 \times (1/2)$ | $D_0' \times 4 \times 768 \times (1/2)$ |
| $S_9$ | $(1/2)T_F$ | x(1/6) | x(1/16) | x(1/15) | $D_0 \times 1440 \times (1/2)$ | $D_0' \times 4 \times 1440 \times (1/2)$ |

Fig.14
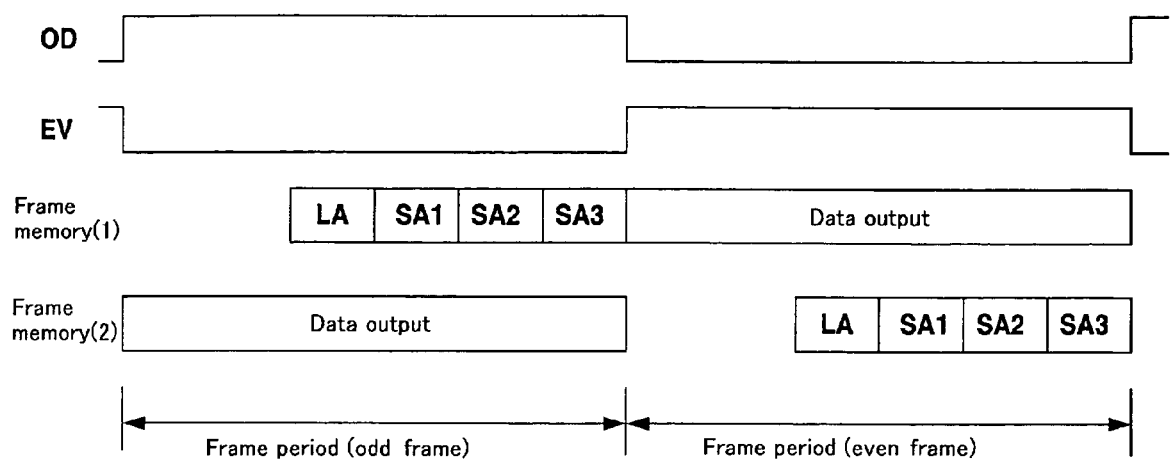
(a) Case of outputting by the pixel clock frequency using two sheets of frame memories
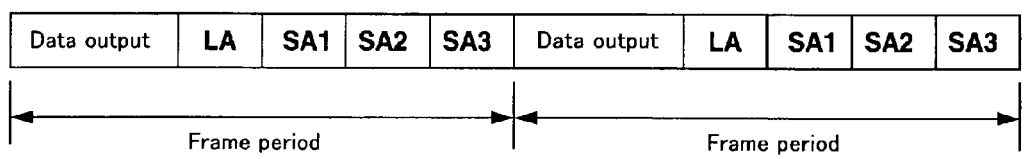
(b) Case of outputting at high speed using one sheet of frame memories

WIDE DYNAMIC RANGE IMAGE SENSOR

TECHNICAL FIELD

The present invention relates to the widening of the dynamic range of an image sensor.

BACKGROUND ART

There exist a great number of conventional technologies for image sensors that have a wide dynamic range that permits favorable imaging even in cases where a very bright portion and a dark portion exist simultaneously. A large number of systems exist as processes that widen the dynamic range toward high illuminance on a CMOS image sensor.

Proposed systems include (1) a system that calculates the number of clocks until a photodiode reaches a threshold value that is set from the outside by disposing a comparator and a coefficient unit in a pixel circuit, as disclosed in Japanese Patent Application Laid Open No. H7-274072, (2) a system that calculates the number of times a photodiode reaches a threshold value that is set from the outside in one frame cycle by disposing a comparator and a coefficient unit in a pixel circuit, as disclosed in Japanese Patent Application Laid Open No. 2000-253320, (3) a system that accumulates blooming charge of the photodiode in floating diffusion in a period that is sufficiently shorter than one vertical period in a four-transistor pixel circuit and (4) a system that finds the difference between the signal level and the reset level from the signal part that accumulates in a period that is sufficiently shorter than one vertical period by means of a signal detection portion, as disclosed in Japanese Patent Application Laid open No. 2001-169184 and Japanese Patent Application Laid Open No. 2001-186414 respectively, (5) a system that uses floating diffusion of a four-transistor pixel circuit as described in "A High Dynamic Range CMOS APS Image Sensor" published in "the 2001 IEEE Workshop on Charge-Coupled Devices and Advanced Image Sensors", pp 137-140 by Yibing (Michelle) Wang and others as an O/E conversion element of low sensitivity for high illuminance, (6) a system that finds a pixel value by means of floating point notation from the accumulation time and the read signal level that appear in U.S. Patent Publication Nos. 6175383 and 6369737, and 2002/0027606 and "100000-Pixel, 120-dB Imager in TFA Technology" of the IEEE Journal of Solid State Circuits, Vol. 35, No. 5, (7) a system that uses a logarithmic compression pixel circuit in which the signal voltage is logarithmically changed with respect to the incident light amount, as disclosed in Japanese Patent Application Laid Open No. 2000-83198 and Japanese Patent Application Laid Open No. 2002-77733, and (8) a system (U.S. Pat. No. 6,115,065) that seeks to widen the dynamic range by acquiring a long-time accumulation signal and short-time accumulation signal by also reading a row of signals displaced by $\Delta$ when performing signal reading of the nth row in the CMOS image sensor and by mixing the long-time accumulation signal and short-time accumulation signal, and so forth.

DISCLOSURE OF THE INVENTION

The signal accumulation and signal reading timing of a general CMOS image sensor are shown in FIG. 1A, while the signal accumulation and reading timing of the CMOS image sensor that performs burst reading (concentrated reading) are shown in FIG. 1B. This is a case where the pixel number of the vertical direction is five pixels and the vertical blanking period is not considered.

In the case of a general CMOS image sensor, when the pixel number in the vertical direction is $N_V$, reading of one horizontal line's worth of the signal is performed for a time that is rendered by dividing time $T_F$ of one frame by $N_V$ and the reading of signals from all the pixels is performed for the time of one frame.

On the other hand, in the burst reading, the reading time of signals of one horizontal line is reduced and the signal reading from all the pixels is performed in concentrated fashion in a short time. Supposing such a reading method, the signals must be read at high speed and, therefore, there is the problem that the power consumption increases and so forth. However, the displacement of the timing of the accumulation start point of signal charge is small in comparison with that of a comparable conventional method. Hence, there is the advantage that the distortion when an object that undergoes large movements is imaged is relatively small.

(8) in the conventional technology involves implementing an image sensor with a wide dynamic by reading signals of short time accumulation that correspond to $\Delta \times T_H$ (reading time of one horizontal line) also by reading signals of a row displaced by $\Delta$, in the direction in which signals have already been read from the row, when reading signals of the nth row rendered by means of long time accumulation, is performed on the basis of the reading method of FIG. 1A, and then mixing the signals.

However, in such a reading direction, when an object that undergoes large movements is imaged, there is the problem that movement distortion is large. Further, the shortest accumulation time is when $\Delta=1$ and, because the time cannot be less than this, the maximum value of the dynamic range that permits widening is restricted by this fact. In addition, because the reading of the long time accumulation signal and the short time accumulation signal are performed simultaneously in parallel, the adaptive processing that judges in real time whether or not short time accumulation and reading are performed from the information of all the pixels that have undergone long time accumulation, for example, is not possible.

The present invention relates to a wide dynamic range image sensor based on the burst reading (concentrated reading) of signals, and also proposes an adaptive multiple sampling method.

The present invention performs burst reading at high speed of signals rendered by means of long time accumulation from an image sensor and then performs burst reading of signals rendered by means of shorter time accumulation. Burst reading of signals rendered by means of accumulation of a shorter time is then performed. If necessary, these reading processes are repeated further. This is an image sensor designed with a wider dynamic range by reading and mixing signals whose accumulation times are different.

In addition, the present invention is an adaptive dynamic range image sensor that is capable of utilizing the fact that image information of long time accumulation and short time accumulation is obtained in frame units by means of the burst reading, of making settings while judging in real time the maximum value of a signal, whether the signal is saturated and, based on information of a histogram, the gain of the reading circuit, whether to perform burst reading with short time accumulation and very short time accumulation, and the corresponding accumulation times, and of performing imaging while settings are made in the optimum dynamic range.

BRIEF DESCRIPTION OF THE DRAWINGS

FIG. 1 shows the signal accumulation of a general CMOS image sensor and the timing of the reading, and the signal accumulation in the burst reading and the timing of the reading (in the case of vertical pixel number 5, LA: signal accumulation period, LR: signal reading period);

FIG. 7 shows examples of the imaging conditions and the dynamic ranges for each state (when NS=3, NR=3, $N_V$=480, LA, SA1, SA2, and SA3 are a long time accumulation time, a first accumulation time, a second accumulation time, and a third accumulation time. $T_F$ is the frame cycle);

FIG. 14 shows the operations of writing to memory and reading from memory; and

BEST MODE FOR CARRYING OUT THE INVENTION

Figure 2:
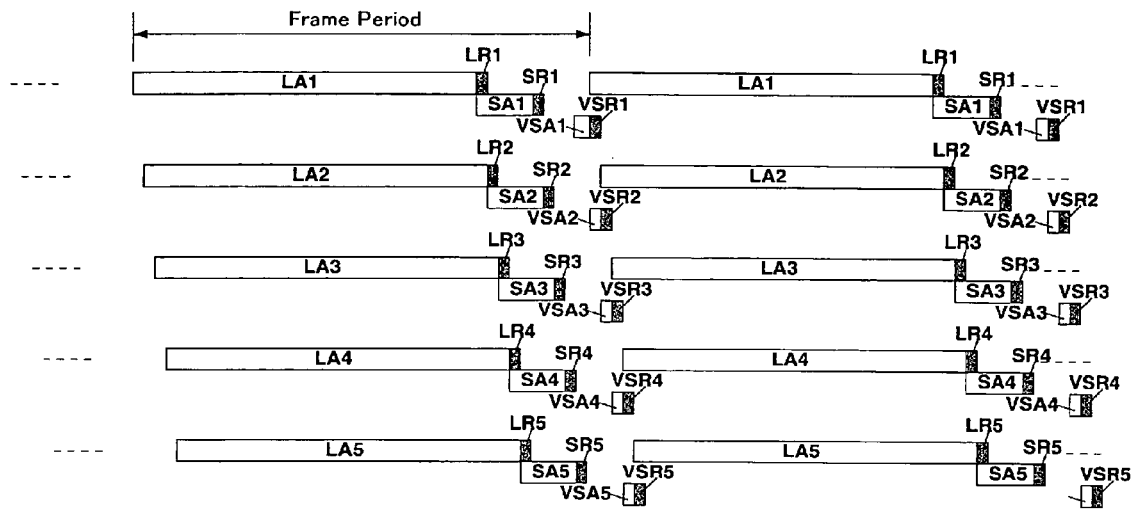
FIG. 2 shows the signal accumulation and timing of the reading (the case of vertical pixel number 5 is shown; LA: long time accumulation signal accumulation period, SA: short time accumulation signal accumulation period, VSA: short time accumulation signal accumulation period, LR: long time accumulation signal reading period, SR: short time accumulation signal reading period, VSR: short time accumulation signal reading period, where the numerals indicate the row numbers corresponding with the image array).

The present invention provides a wide dynamic range image sensor that has characteristics that solve the problems of the conventional technology. First, the present invention is based on the burst reading shown in FIG. 1B. On that basis, a wide dynamic range image sensor is implemented by reading and mixing signals of a plurality of accumulation times such as long time accumulation, short time accumulation, and accumulation of a shorter time. A timing chart for the accumulation and reading of signals of the wide dynamic range image sensor of the present invention is shown in FIG. 2. This example illustrates a case where the number of pixels in the vertical direction is five pixels. Suppose that the total time for reading signals rendered by means of long time accumulation is $T_R$. A signal rendered by means of signal accumulation for the whole of the time rendered by deducting the time, during which long time accumulation is performed, from the frame cycle relating to each pixel, or for that portion of time, is a short time accumulation signal, which is read for the same $T_R$ time. Further, accumulation for a shorter time is performed by using a portion of the remaining time, and reading is performed for the same $T_R$ time. A case where a signal rendered by means of accumulation for a shorter time is read is also similar, and signals of a plurality of accumulation times can be read.

In order to perform reading of a short time accumulation signal after signals of long time accumulation have been read in concentration in a short time, the time for concentrated reading of all the pixels must be long and equal to or less than ½ the frame cycle. As far as the actual constitution is concerned, ¼ or ⅙ of the frame cycle is concerned to be of high practical value. For example, up to two types of short time accumulation are suitably performed when the reading time is ¼ of the frame cycle and up to three types of short time accumulation are suitably performed when the reading time is ⅙ of the frame cycle and, whether or not short time accumulation is performed within this range, imaging of an image of a wide dynamic range can be performed while adaptively changing the time of the short time accumulation.

Now, suppose that the number of burst readings of a short time accumulation signal is $N_S$. In the example of FIG. 2, because two burst readings of signals of a short time accumulation and a shorter time accumulation are performed, $N_S$=2. Further, suppose that the ratio between a long time signal accumulation time $T_{AL}$ and $T_R$, that is, $T_{AL}/T_R$ is $N_R$.

When the frame cycle is $T_F$, the following relation exists.

$$T_R = \frac{T_F}{N_S + N_R} \quad \text{[Equation 1]}$$

Consider a case where m (m types of) short time signal accumulations are performed and the mth signal accumulation time is $T_{AS}(m)$. The longest value is $T_{ASMAX}(m)$. According to FIG. 2, $T_{ASMAX}(m)=T_R$. The accumulation time can be optionally selected with this as the maximum value. However, in order to facilitate the control, the accumulation time is set as follows.

Suppose that the pixel number in the vertical direction is $N_V$ and the time $T_H$ for reading one horizontal line, where the vertical blanking period is $T_B$, is:

$$T_H = \frac{T_R - T_B}{N_V} \quad \text{[Equation 2]}$$

Suppose that $T_B$ is selected as the integer multiple of $T_H$ and $T_B=N_B \times T_H$. This fact is used to choose the short time accumulation time as follows:

$$T_{AS}(m) = nT_H$$

Here, n is an integer and $0 \leq n \leq N_V+N_B$. Supposing that the shortest accumulation time permitted by this method is $T_{ASMIN}(m)$, this is a case where n=1, and $$T_{ASMIN}(m) = T_H$$

From this, the maximum dynamic range expansion ratio for a typical image sensor that performs long time accumulation over one frame cycle is $T_F/T_{ASMIN}(m)$ and is given as follows.

$$\frac{T_F}{T_{ASMIN}(m)} = (N_V + N_B)(N_S + N_R) \qquad \text{[Equation 3]}$$

For example, when $N_S=3$, $N_R=4$, and $N_V+N_B=484$, an expansion 3388 times, that is, up to approximately 71 dB, is possible. When the same calculation is performed for (8) of the conventional technology, with the conventional technology, the expansion ratio of the dynamic range is a multiple of the vertical pixel number, that is, $N_V$, and, therefore, 480 times, that is, approximately 54 dB. It is clear that the present invention is advantageous with respect to the dynamic range expansion.

Figure 3:
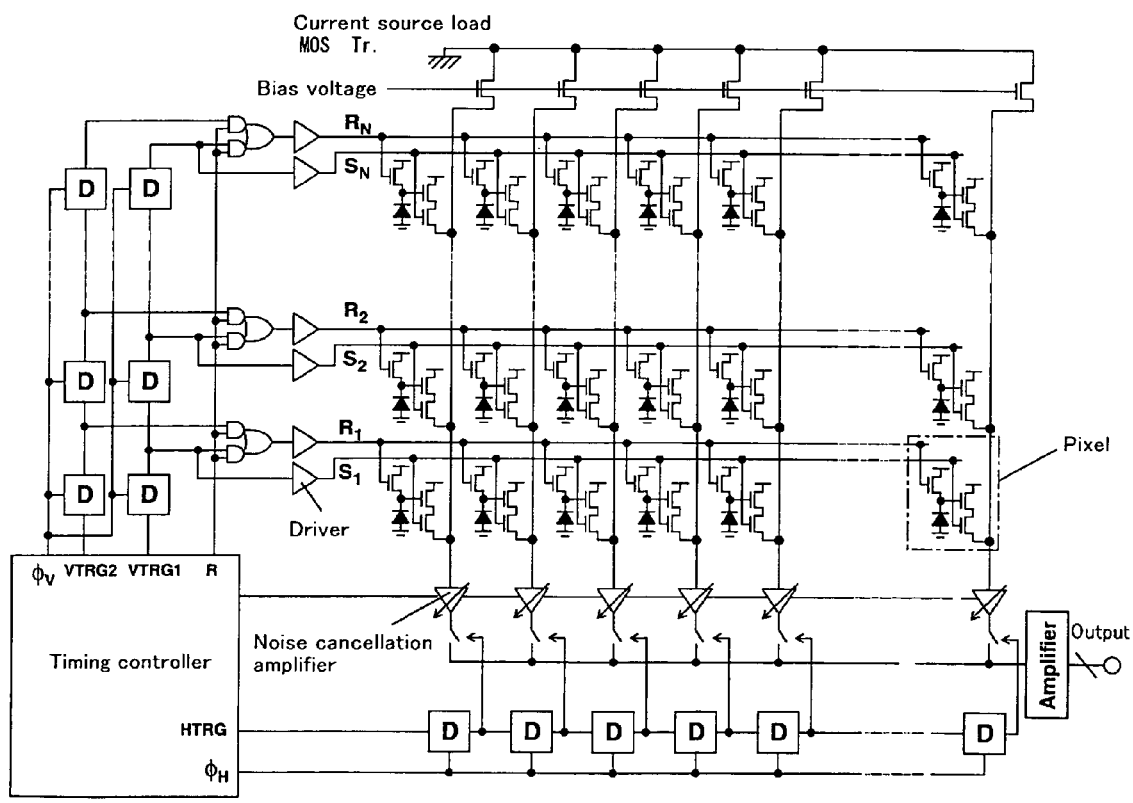
FIG. 3 is a block diagram of a wide dynamic range image sensor.

The circuit constitution of a wide dynamic range image sensor based on such principles will be described next. FIG. 3 shows a block diagram of the circuit constitution.

Figure 4:
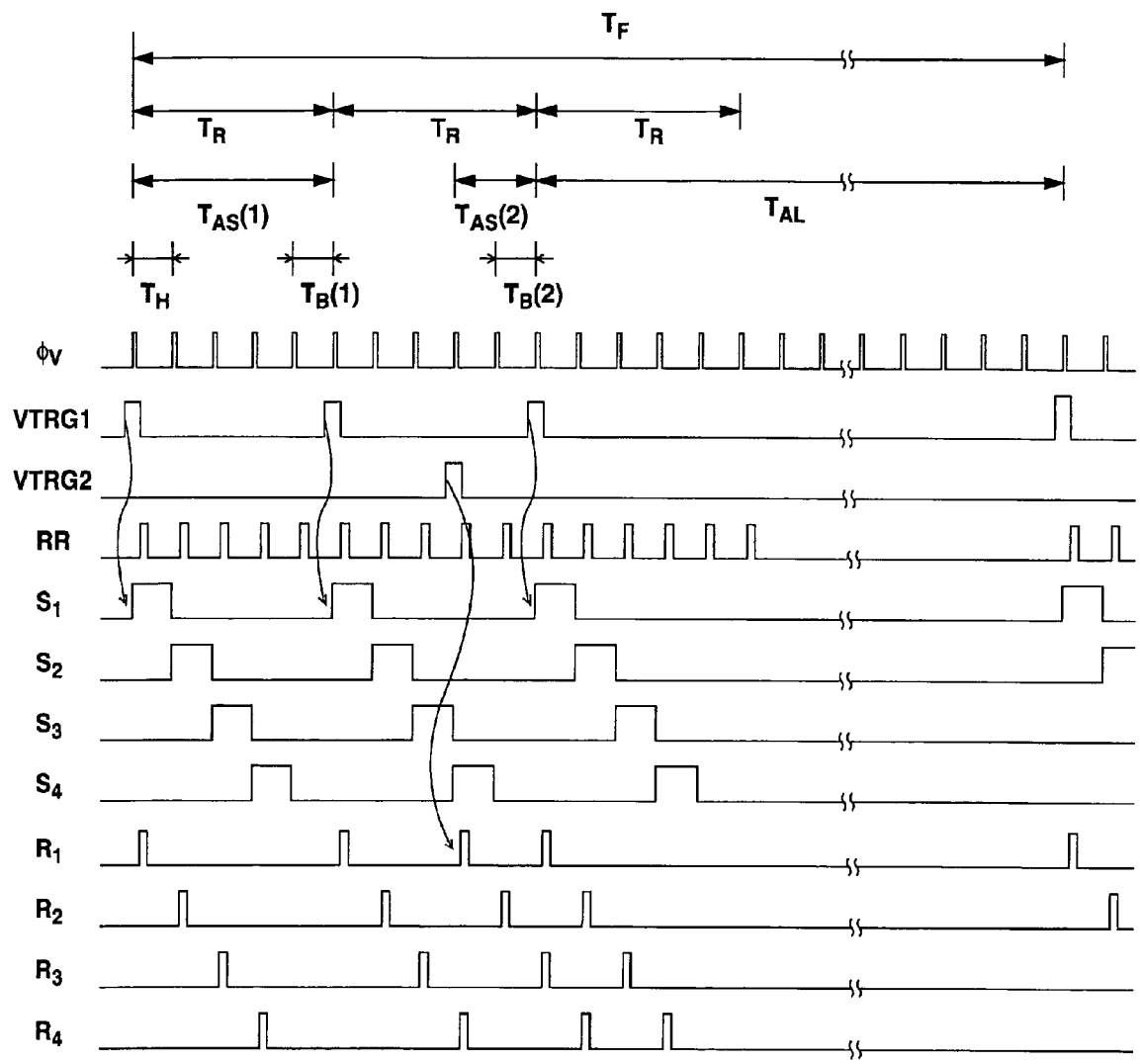
FIG. 4 shows the control signal timing in a case where the vertical pixel number is four pixels.

Further, the dynamic of the control signal when $N_V=4$, $N_B=1$, $N_S=2$ in FIG. 3 is shown in FIG. 4. Suppose that $T_{AS}(1)=T_R$ and $T_{AS}(2)=2T_H$.

Burst reading is performed in the initial period of $T_R$ on signals rendered by means of long time accumulation. Short time (the time $T_{AS}(1)$) accumulation is performed by using this period and burst reading is performed in the next period $T_R$. Accumulation of a shorter time (time $T_{AS}(2)$) is performed by using a portion of this period and burst reading is performed in the next period $T_R$.

In order to allow such an operation to be performed, two trigger signals (VTRG1 and VTRG2) that are supplied to a vertical shift register (the chain of flip flops indicated by the symbol D in FIG. 3) are supplied as shown in FIG. 4. VTRG1 is a trigger for burst reading and VTRG2 is a trigger signal that is supplied to a vertical shift register provided especially in order to produce a reset signal for performing a shorter time accumulation than $T_R$. By supplying VTRG2 with the timing shown in FIG. 4, $T_{AS}(2)=T_H+T_B=2T_H$.

In the burst reading, because the reading speed is high, there is the possibility of an increase in power consumption. There is an increase in the power consumption of the A/D converter in particular. However, except the time when reading is performed in one frame cycle, the reading circuit and A/D converter need not be operated and lower power consumption can be achieved by cutting the startup power. More specifically, the power during standby can be greatly reduced without rendering the circuit unstable by setting a current value rendered by reducing the current to about 1/10 during standby from the current value for normal operation, for example.

Figure 5:
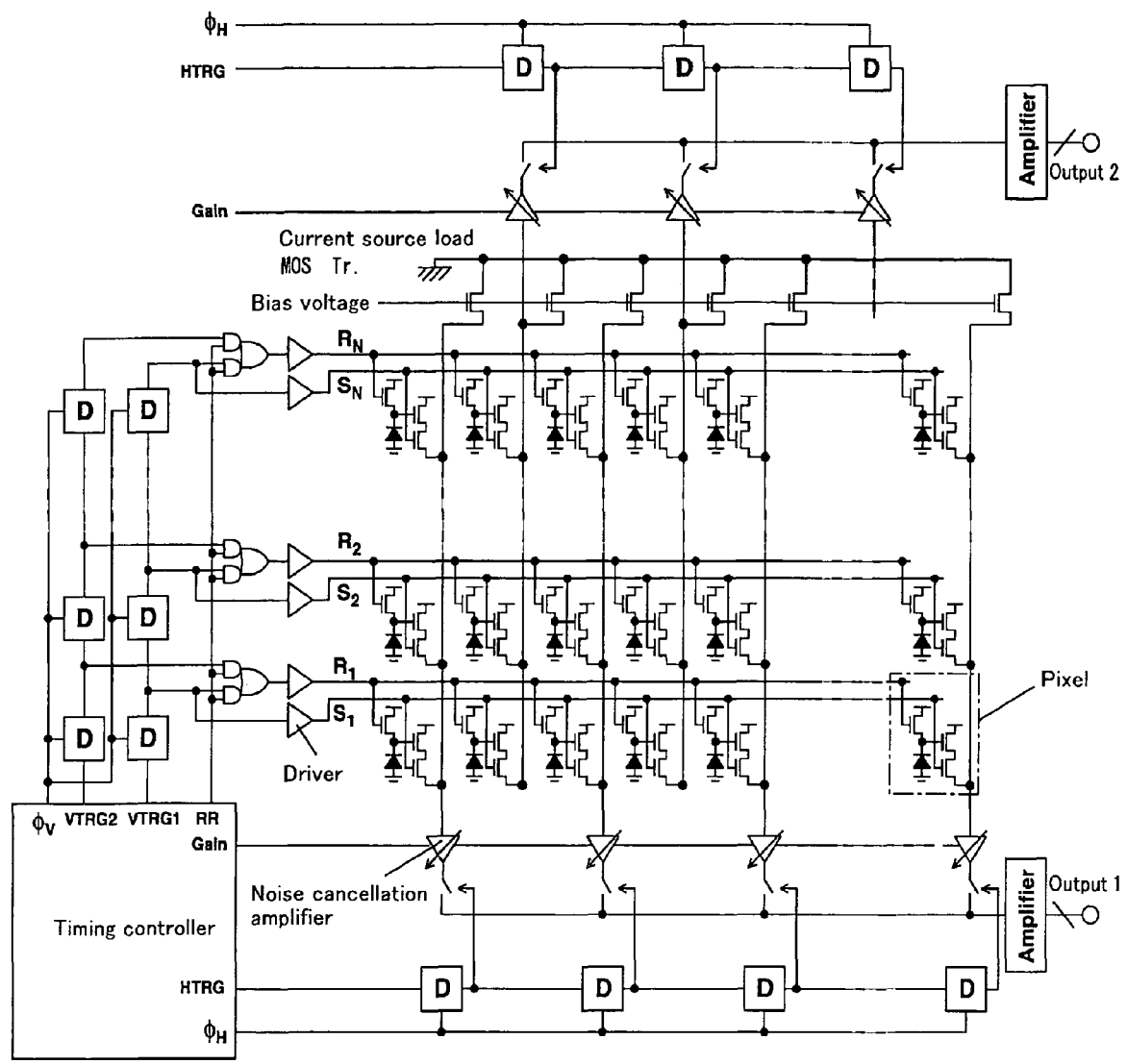
FIG. 5 is a constitutional view of a case where the reading circuit has two channels.
Figure 6:
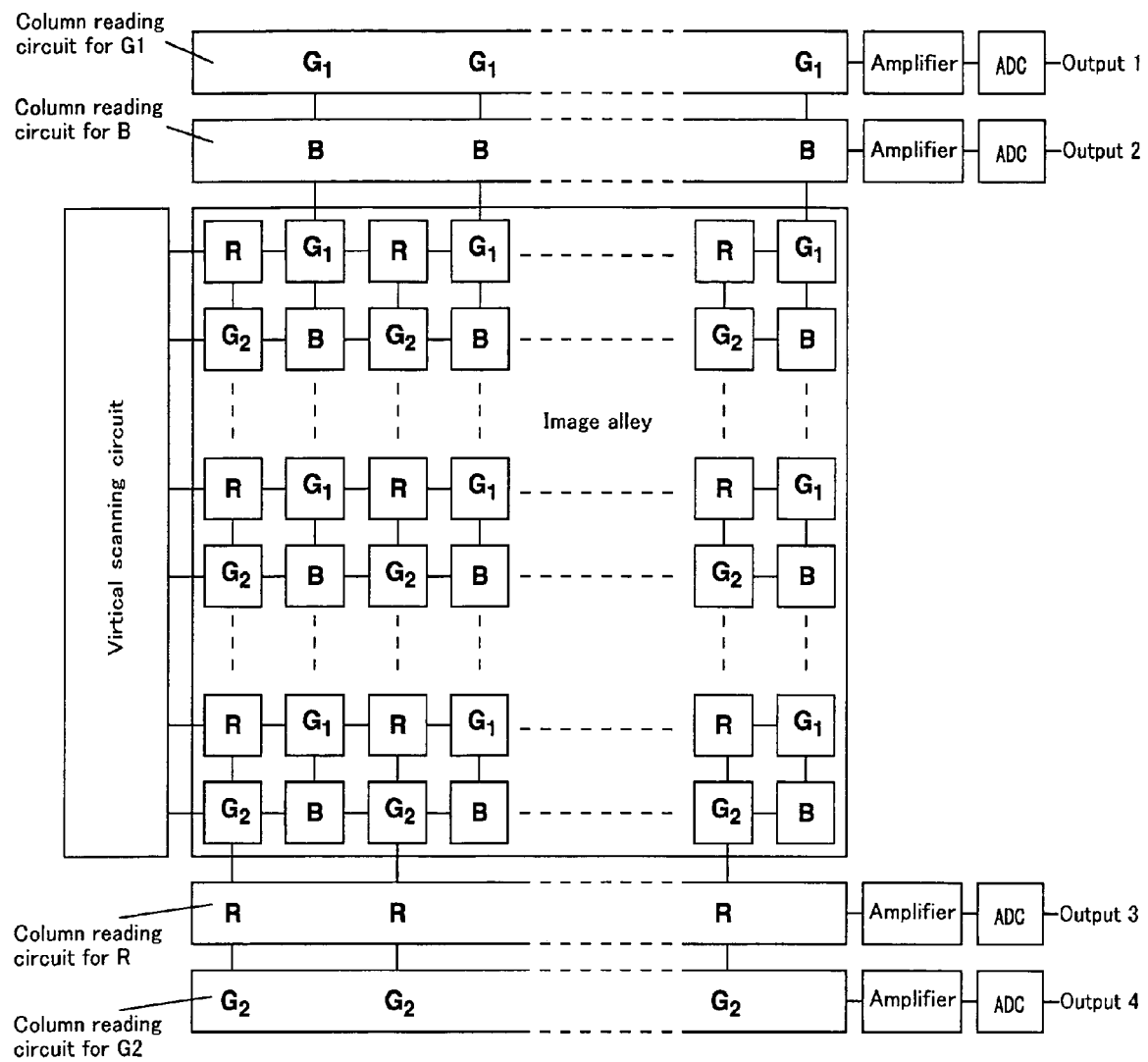
FIG. 6 is a constitutional view of a wide dynamic range image sensor in a case where the four components of the primary color filters are outputted in parallel.

Further, so that the reading speed is high, the operating speed is sometimes not reached by one reading circuit alone and, in this case, as shown in FIG. 5, a method in which the reading circuit is provided with two channels, or four channels as per FIG. 6, may also be considered. In the case of a single plate-type color image sensor that uses a color filter, the R, B, G1, and G2 components of the primary color filters in a Bayer arrangement, for example, are read to each of the reading circuits of four channels, whereby horizontal reading can be executed in parallel. In this case, correction of the shift in the characteristic of the four reading circuits can be performed simultaneously when processing the color signals, which is efficient. The ADC in FIG. 6 is an A/D converter.

Further, although a case of a three-transistor pixel circuit was illustrated hereinabove, a four-transistor pixel circuit that employs in-pixel charge transfer, or the like, or another image circuit can also be used. For example, in the case of a four transistor pixel circuit, the control signal for the charge transfer may also be produced, in addition to the reset signal, by means of the VTRG2 in FIGS. 4 and 5.

In the case of a wide dynamic range image sensor that uses such burst reading, in order to reconcile the two points of reducing movement distortion and obtaining a wide dynamic range image, the movement of an imaging target to be mounted in a vehicle or the like is large and the wide dynamic range is adapted to the required application.

One more advantage of this system is that long-time accumulation and short-time accumulation images can be obtained individually and, therefore, a judgment of whether the setting of conditions for short time accumulation imaging based on image information obtained by means of long time accumulation, or short time accumulation imaging are required can be executed in real time.

In the burst reading, it can be determined whether or not to perform the next short-time accumulation reading and whether or not to perform the charge initialization operation for the pixel portion for this purpose after completely finishing the reading of the signals of all the pixels. When this fact is used, imaging can be performed while setting in real time the optimum dynamic range in accordance with the target being imaged. That is, adaptive dynamic range imaging is possible.

FIG. 7 comprises ten states with different imaging conditions and values for the dynamic range obtained in each of these states. S0 is for a case where only long time signal accumulation and reading are performed and the dynamic range in each state is taken with the then dynamic range serving as a reference. LS is the long time accumulation signal and SA1, SA2, SA3 signify short time accumulation signals. However, the values in FIG. 7 represent the ratio between the accumulation times of SA1 with respect to LA, SA2 with respect to SA1, and SA3 with respect to SA2. Further, when the short time accumulation signal is read, the time of the long time accumulation is shortened to the extent of the short time accumulation signal and the sensitivity drops. Therefore, the effect is entered in the calculation of the dynamic range. Further, a case where only long time signals are amplified with gain G=4 in the column of the image sensor is also shown. Supposing that the dynamic range $D_0$=66 dB in a case where G=1 and the dynamic range $D_0'$=60 dB when G=4, expansion is possible up to a maximum (when the state is state S9) of 123 dB and 29 dB.

Figure 8:
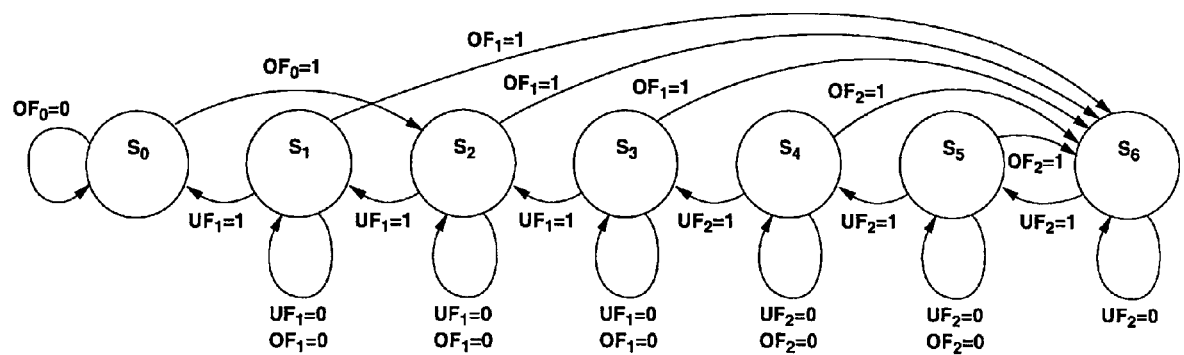
FIG. 8 shows an example of a state transition diagram for setting the adaptive dynamic range.

A state transition diagram for a case where imaging is performed while setting the dynamic range in real time to an optimum value for when short time accumulation is performed twice in FIG. 7, that is, when S0 to S6 are used, is shown in FIG. 8. That is, the imaging conditions are dynamically set by using overflow flags $OF_0$, $OF_1$, $OF_2$, which indicate whether the long time accumulation signal, and first and second short time accumulation signals exceed the maximum amplitude that can be handled, and underflow flags $UF_1$ and $UF_2$, which indicate whether the maximum value of the first and second short time accumulation signals is sufficiently small in comparison with the maximum amplitude that can be handled.

FIG. 8 shows a block diagram of processing for setting the dynamic range. First, where the overflow flags are concerned, the output Y of the A/D converter (ADC) is compared with a set threshold value $T_1$ and the number of pixels exceeding $T_1$ is counted by means of a counter. This number is $N(Y, T_1)$ and if this number is equal to or more than the set threshold value $T_3$, the overflow flag is 1. Expressing this by means of an equation,

[Equation 4]

$$OF_i = \begin{cases} 0 & (N(Y, T_1) < T_3) \\ 1 & (N(Y, T_1) \geq T_3) \end{cases} \quad (1)$$

Here, with i of OFi, i=0, 1, and 2 and $OF_1$, $OF_2$, and $OF_3$ are overflow flags for the long time accumulation signal, the first short time accumulation signal, and the second short time accumulation signal.

Further, where the underflow flags are concerned, the output Y of the ADC is compared with a set threshold value $T_2$ and the number of pixels that exceed $T_2$ is counted by means of the counter. This number is $N(Y, T_2)$ and if this number is equal to or less than the set threshold value $T_3$, the underflow flag is 1. Expressing this as an equation gives:

[Equation 5]

$$UF_i = \begin{cases} 0 & (N(Y, T_2) > T_3) \\ 1 & (N(Y, T_2) \leq T_3) \end{cases} \quad (2)$$

Here, i of UFi is i=1, 2 and $UF_1$ and $UF_2$ are underflow flags that are judged from Y with respect to the first short time accumulation signal and second short time accumulation signal.

By using these flags, imaging under optimum conditions where the signal is substantially saturated can be performed while adaptively changing the dynamic range as per the transition diagram in FIG. 8.

In the burst reading in particular, for example, it can be judged whether or not the long time accumulation signal is saturated even in the case of sudden brightness after a state in which imaging is continued by means of only a long time accumulation signal in a state of overall low illuminance and a transition can be made immediately thereafter to a short time accumulation signal reading state, whereby an image without saturation can be acquired.

Further, when an equal problem of sensing flickering is produced as a result of frequently changing the imaging conditions of such a wide dynamic range for each frame, the overflow and underflow flags are produced only when the conditions shown in Equations (1) and (2) and so forth are continually exceeded over any frames and the actual state transition is made only once for a plurality of frames instead of being executed for each frame.

Figure 10:
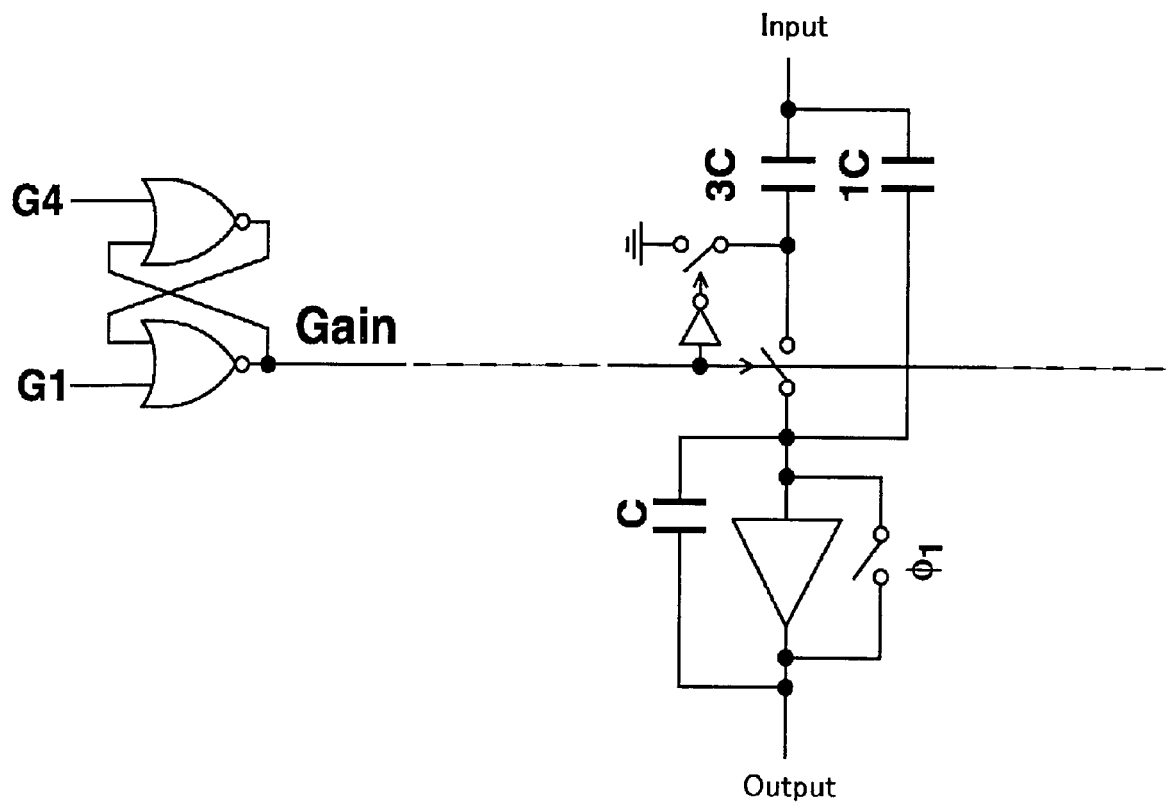
FIG. 10 is a column noise cancellation circuit that makes it possible to select one time and four times the gain.

Furthermore, the signal reading noise is lowered by means of low noise in the low illuminance by switching between a large gain and a small gain while performing noise canceling in the image sensor column, whereby the dynamic range expansion toward low illuminance is made possible. An example of a column noise cancellation circuit that switches the gain between one and four times is shown in FIG. 10. The column noise cancellation circuit is a switch transistor-type noise cancellation circuit that employs an inverting amplifier. When 1 is supplied to the Gain input, the capacitance connected to the input side is 4C and amplification of four times is produced by means of the ratio with the capacitance C connected between the input and outputs of the inverting amplifier. When 0 is supplied to the Gain input, 3C at the input is disconnected and the capacitance ratio is 1, whereby amplification of times one is produced. Further, this circuit alternately supplies the reset level and the signal level from the pixel to the input. In the case of the three-transistor pixel circuit shown in FIG. 3, the signal level is supplied first, whereupon the switch controlled by the φ1 in FIG. 10 is turned ON and the signal level is sampled as the input capacitance. Thereafter, by turning the switch controlled by φ1 OFF and supplying the reset level to the input, the difference in the input level and reset level is amplified and outputted, whereby the noise canceling operation is implemented. Further, a case of four transistors that perform charge transfer within a pixel by using an embedded photodiode is similarly applicable with the sole difference that the reset level is supplied first followed by the signal level.

Figure 9:
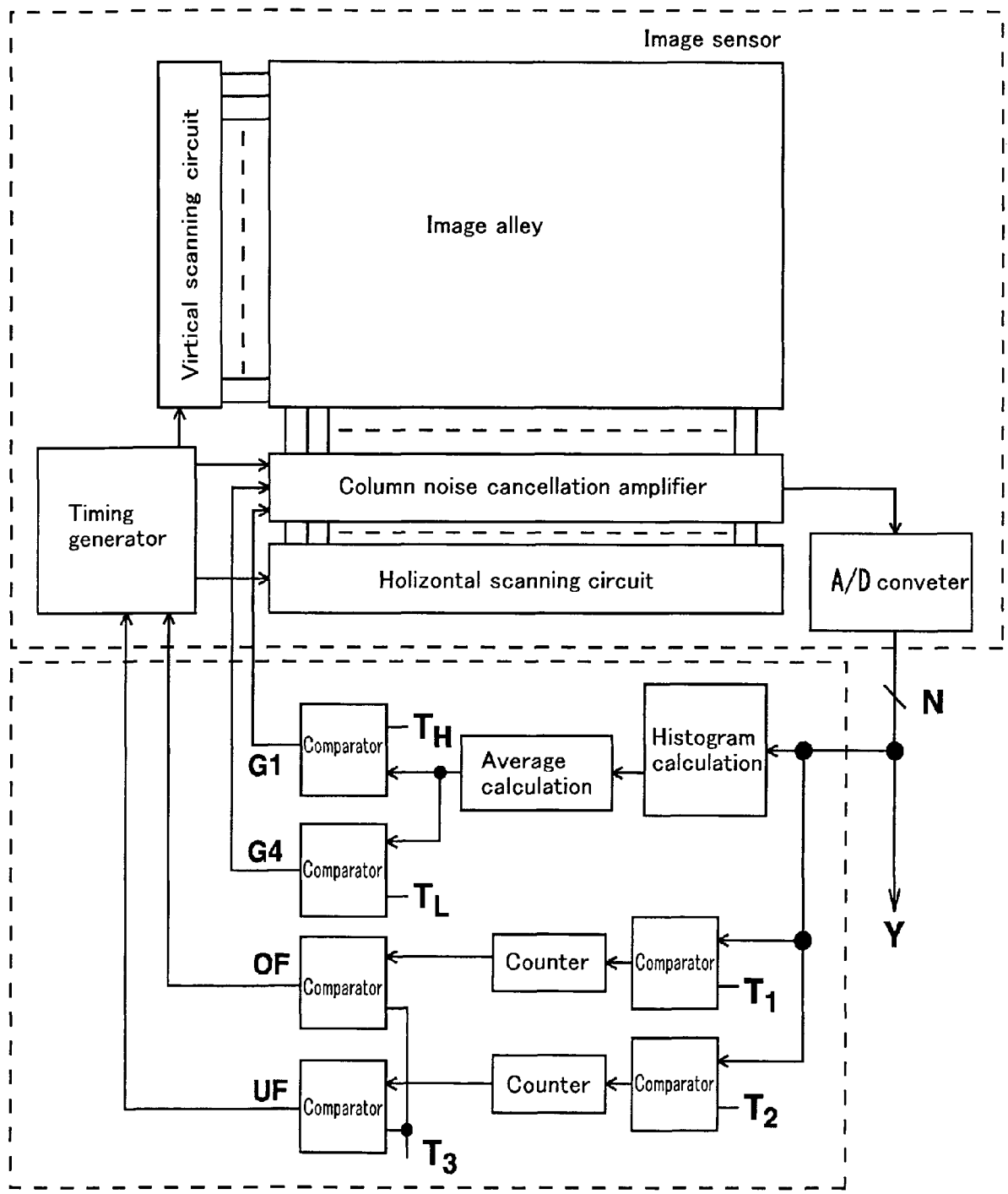
FIG. 9 is a block diagram of a processing circuit that adaptively changes the dynamic range.

The setting of a four times gain can be used for both the reading of long time accumulation signals and also short time accumulation signals. However, within the meaning of raising the sensitivity of a low illuminance area in particular, the application to long time accumulation signals is effective. As a method for switching the gain for a long time accumulation signal between one and four times, the use of a histogram rendered by calculating the long time accumulation signal one frame before from a signal obtained by reading all the pixels is effective. The constitution of the processing circuit for this purpose is shown in FIG. 9. This method will now be described. For the output Y of the ADC, an image of N grayscales is divided into M areas. First, a histogram H(i) is initialized for i=0, . . . , M−1. That is, $$H(i)=0 (i=0, \ldots, M-1)$$

where the following is executed for all the pixel outputs. (i=0, . . . , M−1)

[Equation 6]

$$H(i) = \begin{cases} H(i)+1 & \left(\text{if } \left[Y\frac{M}{N}\right] = i\right) \\ H(i) & \left(\text{if } \left[Y\frac{M}{N}\right] \neq i\right) \end{cases}$$

Here, [x] signifies an integer rendered by discarding numbers after the decimal point of x. The average value of the histogram thus obtained will now be calculated.

[Equation 7]

$$\overline{H} = \frac{1}{M} \sum_{i=1}^{M-1} H(i)$$

Figure 11:
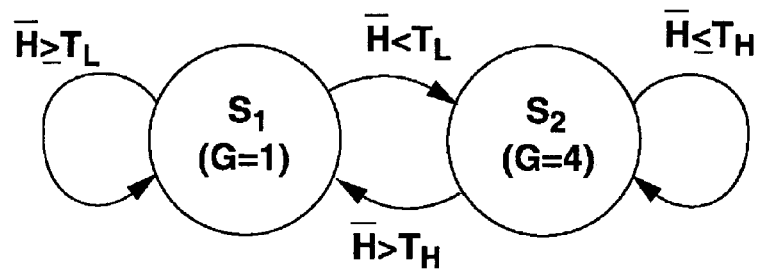
FIG. 11 is a state transition diagram for gain settings.

By using this equation, the gain of the column amplifier is in accordance with the state transition diagram shown in FIG. 11 and the gain is established in column units.

This produces an operation like that detailed below. If the gain G of the current column amplifier is 1 and the average value of the histogram is smaller than a certain threshold value $T_L$, the gain G of the column amplifier is 4, and, if the average value is equal to or more than $T_L$, G=1. This completes the settings prior to reading a new frame image. The average value of the histogram is calculated in the same way as the frame and, if the average value is smaller than another threshold value $T_H$, G=4. If the threshold value $T_H$ is exceeded, the gain is stored to G=1. Further, in FIG. 9, when G=1, G1 is set at 1 and, when G=4, G4 is set at 1. The two control signals are supplied to an RS flip flop for establishing the gain of the column noise cancellation amplifier in FIG. 10 and, when G1 and G4 are both 0, the set state is maintained.

By performing the above, the gain for reading the image signal of the next frame can be optically controlled while observing the brightness distribution one frame back. In this case, when there is a sudden increase in brightness after a certain frame, the long time accumulation signal is probably saturated by setting G=4. However, in this case, a pixel signal that is saturated by reading a short time accumulation signal can be substituted for a short time accumulation signal.

The act of rendering the gain of the column amplifier variable can be performed only for signals rendered by means of long time accumulation but may also be performed in the same way for a short time accumulation signal. Further, as a histogram for determining the gain of the column amplifier when reading the long time accumulation signal of the next frame, both a method of finding the gain from the long time accumulation signal of the current frame and a method for finding the gain from the short time accumulation signal may be considered.

Further, when there is a problem such as that of sensing flicker when such gain settings are changed for each frame, performing the judgment of conditions for the state transition in FIG. 11 only when the condition is fulfilled over a plurality of frames or reducing the frequency of a state transition so that the state transition is made only once for a plurality of frames may be considered.

The average value of the histogram for a short time accumulation signal found as detailed above can be used not only for setting the gain of the column amplifier but also for setting the adaptive dynamic range. In this case, Equation (2) is changed as per the following equation.

$$UF_i = \begin{cases} 0 & (\overline{H(Y)} > T_L) \\ 1 & (\overline{H(Y)} \leq T_L) \end{cases} \quad \text{[Equation 8]}$$

Here, $$\overline{H(Y)} \quad \text{[Equation 9]}$$

this signifies the average value of the histogram found for the brightness signal Y. This produces an underflow flag depending on whether the average value is equal to or less than the set threshold value $T_L$.

A method for lowering and outputting the frequency of a digitized picture signal by efficiently writing to memory and reading from memory a long time accumulation signal and short time accumulation signals of a plurality of types while sparing the frame memory will be described next. Here, a case where a long time accumulation signal and short time accumulation signals of three types are read from an image sensor will be described.

First, the ratio of the distribution of the respective areas is decided for the whole full scale FS. Suppose that the long time accumulation signal and the three short time accumulation signals are represented by the symbols LA, SA1, SA2, and SA3 shown in FIG. 7 and each of the accumulation times are $T_L$, $T_{S1}$, $T_{S2}$, and $T_{S3}$.

Further, $T_L > T_{S1} > T_{S2} > T_{S3}$.

Suppose that the distribution ratios for each are $F_L$, $F_{S1}$, $F_{S2}$, and $F_{S3}$. Here, $$FS = F_L + F_{S1} + F_{S2} + F_{S3}.$$

Figure 12:
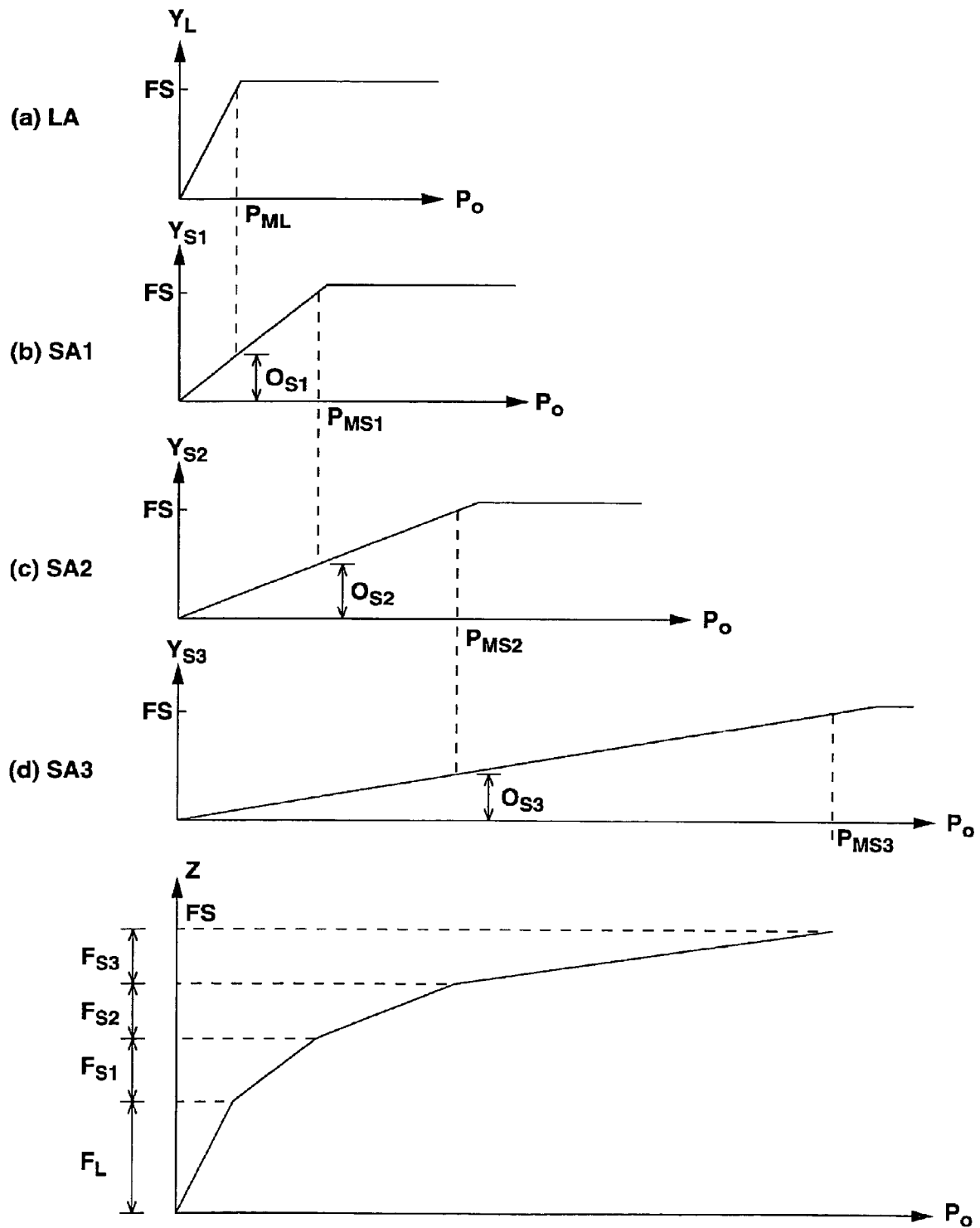
FIG. 12 shows the composition of a nonlinear response characteristic that uses the long time accumulation signal LA and the three types of short time accumulation signal (SA1, SA2, and SA3)

Further, the FS for each accumulation signal is set not at a completely saturated level but rather at a level somewhat lower than the saturation level, as shown in FIG. 12.

First, an output $Z_{OUT}$ that is written to memory for the output Y of the long time accumulation signal LA is decided as per the following equation.

$$Z_{OUT} = A_L \times Y$$

Here, $A_L = F_L/FS$, which is the gain constant for a long time accumulation signal. That is, a signal rendered by applying a fixed gain to a long time accumulation signal is an output candidate.

Thereafter, the output $Z_{OUT}$ that is written to memory for output Y of the initial short time accumulation signal SA1 and value $Z_M$ stored in memory is decided as per the following equation.

$$Z_{OUT} = \begin{cases} Z_M & (Z_M < F_L) \\ A_{S1}(Y - O_{S1}) + F_L & (Z_M \geq F_L) \end{cases} \quad \text{[Equation 10]}$$

Here, $$A_{S1} = \frac{F_{S1}}{FS - O_{S1}} \quad \text{[Equation 11]}$$

and $$O_{S1} = \frac{T_{S1}}{T_L} FS \quad \text{[Equation 12]}$$

are a gain constant and offset for a first short time accumulation signal. This means that, if the value that is written to memory does not exceed $F_L$, the long time accumulation signal is rewritten to memory and, if the value written to memory exceeds $F_L$, the value is substituted for a short time accumulation signal. Thereupon, because two areas are continuously connected, a gain is applied to a signal rendered by deducting the offset from Y for a shift through $F_L$.

Likewise, the output $Z_{OUT}$ that is written to memory with respect to the output Y of the second short time accumulation signal SA2 and the value $Z_M$ that is stored to memory is decided as per the following equation.

$$Z_{OUT} = \begin{cases} Z_M & (Z_M < F_L + F_{S1}) \\ A_{S2}(Y - O_{S2}) + F_L + F_{S1} & (Z_M \geq F_L + F_{S1}) \end{cases} \quad \text{[Equation 13]}$$

Here, $$A_{S2} = \frac{F_{S2}}{FS - O_{S2}} \quad \text{[Equation 14]}$$

and $$O_{S2} = \frac{T_{S2}}{T_{S1}} FS \quad \text{[Equation 15]}$$

is a gain constant and offset for the second short time accumulation signal.

In addition, similarly also for the output Y of the third short time accumulation signal SA3, $$Z_{OUT} = \begin{cases} Z_M & (Z_M < F_L + F_{S1} + F_{S2}) \\ A_{S3}(Y - O_{S3}) + F_L + F_{S1} + F_{S2} & (Z_M \geq F_L + F_{S1} + F_{S2}) \end{cases} \quad \text{[Equation 16]}$$

Here, $$A_{S3} = \frac{F_{S3}}{FS - O_{S3}} \quad \text{[Equation 17]}$$

and

-continued $$O_{S3} = \frac{T_{S3}}{T_{S2}} FS \quad \text{[Equation 18]}$$

are a gain constant and offset for a third short time accumulation signal.

Figure 13:
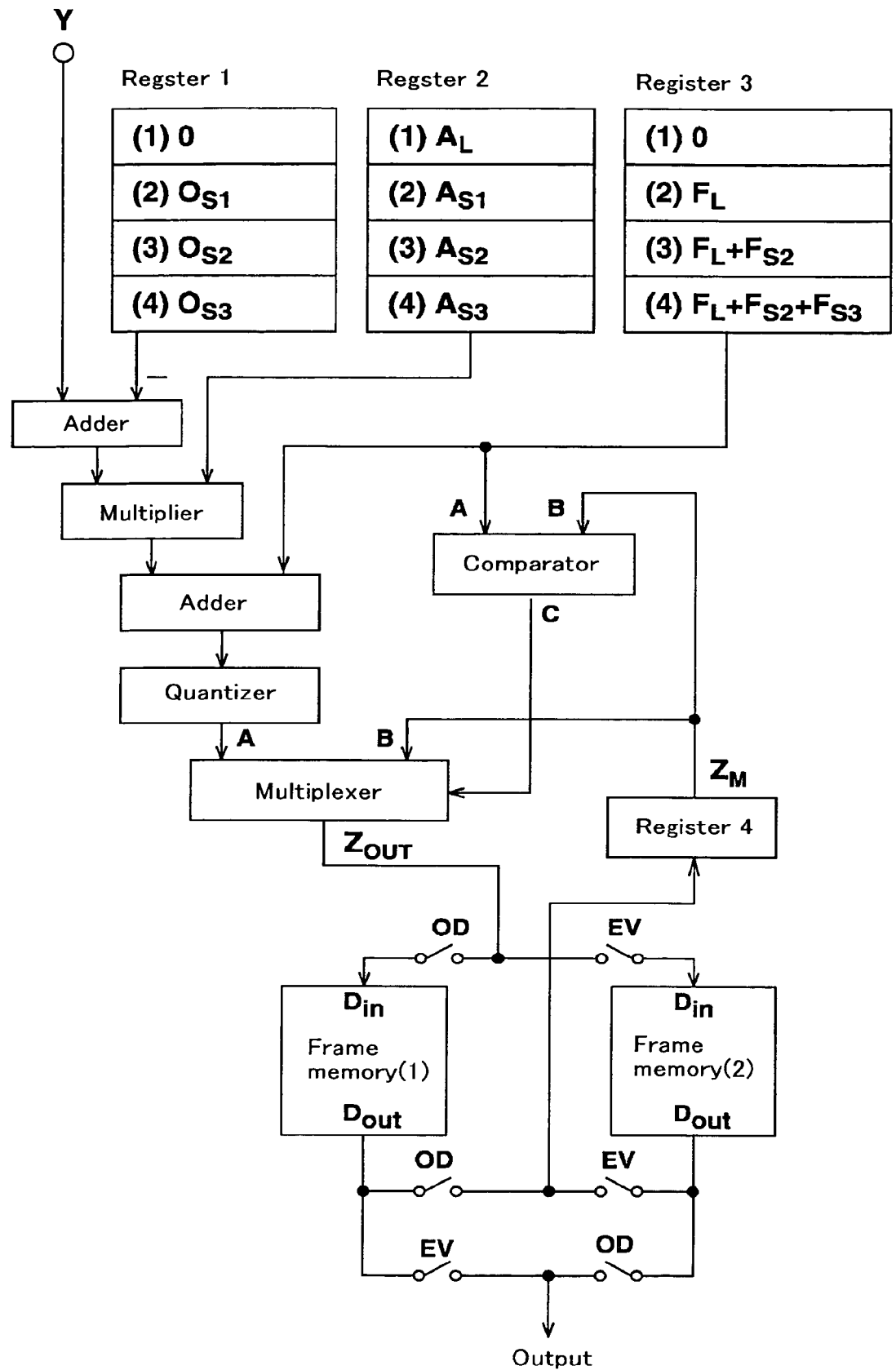
FIG. 13 is a block diagram of processing for obtaining the transformation characteristic in FIG. 12.

As a result of the above processing, the response characteristic of the output with respect to the incident light amount $P_O$ is as per FIG. 12. The constitution of the processing circuit for performing such processing is shown in FIG. 13.

Thus, a signal the dynamic range of which is compressed can be stored to memory while being calculated in real time. The registers 1, 2, and 3 in FIG. 13 output values that are written within the limits for the long time accumulation signal, and first, second, and third short time accumulation signals in the order (1), (2), (3), and (4). The comparator outputs a value as per the following equation as an output C for inputs A and B.

[Equation 19]

$$C = \begin{cases} 0 & (A > B) \\ 1 & (A \leq B) \end{cases} \quad (3)$$

Moreover, a multiplexer selects the A side if the control input, that is, output C of the comparator is 1 and the B side if C=0.

In FIG. 13, two frame memories are used to match the speed of the digital output to the pixel clock frequency of the image sensor. The operation is shown in FIG. 14A. In FIG. 14A, LA is the long time accumulation signal and SA1, SA2, and SA3 signify the periods for writing the short time accumulation signals to memory, where upon an operation that first reads a signal that has already been written to the frame memory for the corresponding pixel signal to a register 4 and rewrites the computation results to the same pixel signal of the frame memory is executed. The output from the frame memory to the outside is performed for the time of one frame. By switching the two frame memories as per FIG. 14A by using control signals OD and EV that represent odd-numbered frames and even-numbered frames respectively, writing and reading operations between image sensors and outputs to the outside from memory are performed complementarily, whereby outputs from the frame memory to the outside can be read for one frame.

Further, by using only one frame memory, an output can also be outputted at high speed and, in this case, as per FIG. 14B, the image sensor performs an accumulation operation of a long time signal and reads and outputs same from the frame memory by using a period during which a signal is not being outputted.

Figure 15:
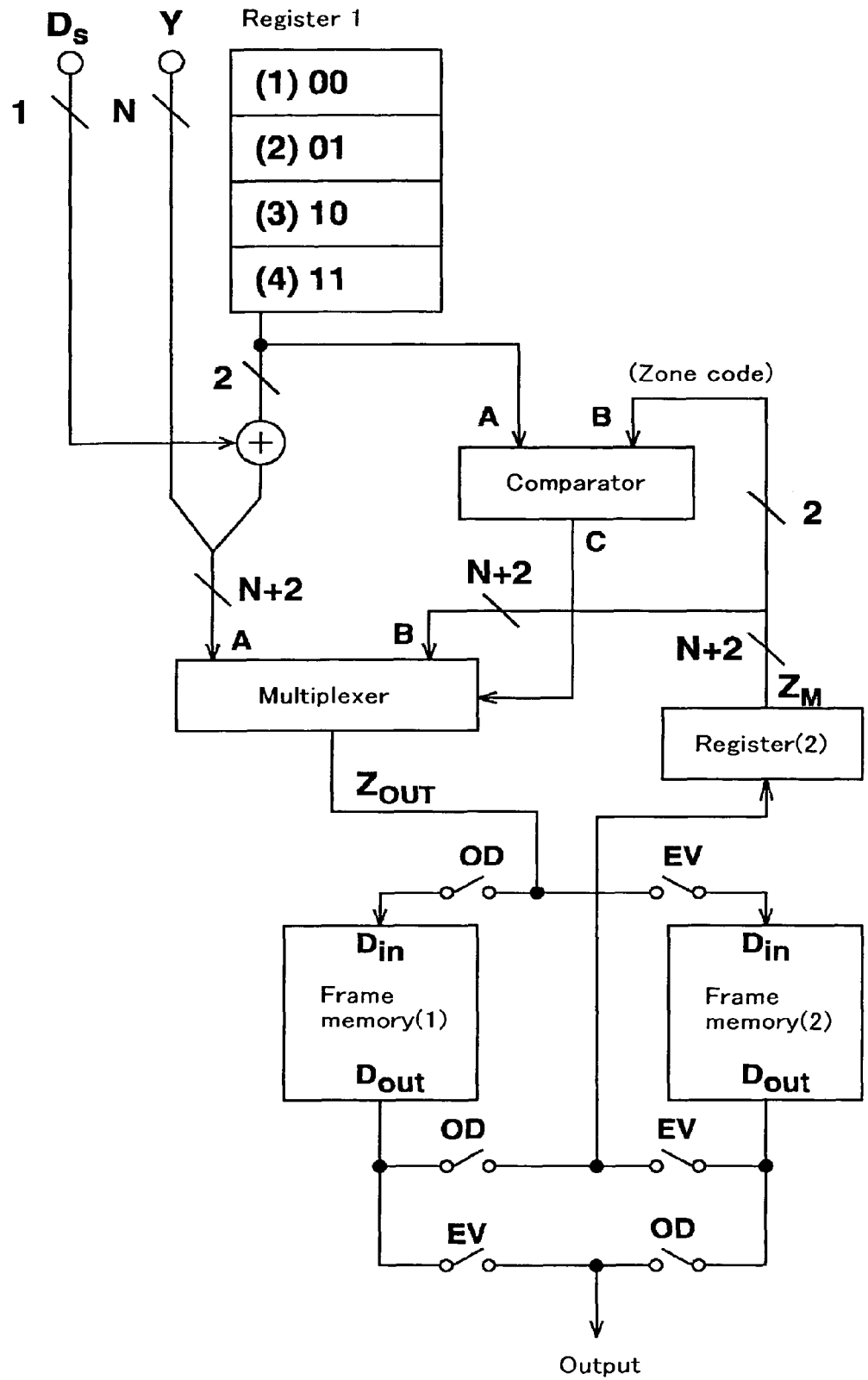
FIG. 15 is a block diagram of processing in a case where a picture signal and a zone number representing the accumulation time are written.

In addition, by not performing mixing with such a wide dynamic range image, the source signal and a zone number representing the accumulation time can also be stored in the image memory. The block diagram of the processing in this case is shown in FIG. 15.

First, the A/D converter has a function for outputting a saturation flag Ds that adopts a value of 1 when the full scale is exceeded and 0 when the full scale is not exceeded in a case where there are N bits. A code produced by adding the value of Ds to a two-bit code representing the zone is written to memory together with the output Y of the image sensor. For the initial long time accumulation signal, the value of Y and a code rendered by adding Ds to the zone code (00) are written to memory. The multiplexer always selects the sensor output side (Aside) because (00) is supplied to the A input of the comparator. Thereafter, the value of the register 1 and the zone code of the long time accumulation signal stored to memory are compared for the first short time accumulation signal.

Thereupon, if the long time accumulation signal is saturated, (01) is read and, therefore, supposing that the comparator performs the operation provided by Equation (3), the comparison output C is 1 and the sensor output side is selected by the multiplexer, whereby the value of the memory is updated. If the long time accumulation signal is not saturated, (00) is read and, as a result of a comparison with (01), C=0 and the memory output side is selected by the multiplexer. Therefore, the same value is rewritten and the long time accumulation signal is stored as is without the memory storage value being updated.

The same is also true for the second short time accumulation signal and third short time accumulation signal. However, where the reading of the third short time accumulation signal is concerned, the value of $D_S$ is always 0. Because accumulation signals of shorter times are not read, information on whether the signal is saturated is not required. If the second short time accumulation signal is not saturated, because the zone code that is read from memory is (11), the sensor output side is selected and the memory value is updated.

In the case of FIG. 15, there is the advantage that the A/D converted source signal can be stored as is. However, for a display as a wide dynamic range image, conversion processing such as that shown in FIG. 12 subsequently is necessary.

Although it has been explained that, in cases where the accumulation signal stored to memory is not saturated, the same value is written by selecting the memory output side by means of the multiplexer, it is clear that the writing operation itself may not be performed in this case.

INDUSTRIAL APPLICABILITY

As per the constitution described above, the following effects are obtained.

(1) By reading at high speed, the shutter timing of all the pixels is alleviated in comparison with the rolling shutter of a conventional CMOS image sensor. As a result, distortion when imaging a moving body is alleviated. This makes the image sensor suitable for mounting in a vehicle.

(2) The constitution of the pixel portion is not restricted in any way. Therefore, a highly sensitive CMOS image sensor device can be used. As a result, a widened dynamic range is also possible in low illuminance areas.

(3) By reading at high speed, the subsequent signal processing can be started immediately. As a result, the image sensor is suitable for mounting in a vehicle for which real time processing is required.

(4) An amplifier that changes the gain of the column all together by means of multiple stages is employed. As a result, the sensitivity range can be varied without completely using mechanical iris control. For nighttime usage, because a sensitivity amplifier is originally afforded a wide dynamic range by increasing the gain, a sufficiently wide dynamic range can be secured. The sensitivity amplifier is suited to vehicle mounting that is used under wide illuminance conditions from daytime to nighttime.

(5) By burst-reading long time accumulation, short time accumulation, and short time accumulation signals, a wide dynamic range image sensor that adaptively switches the dynamic range can be implemented.

The invention claimed is:

1. A wide dynamic range image sensor, comprising:
an image array sensor;
means for obtaining a long time accumulation signal from the image array sensor;
means for obtaining short time accumulation signals of a plurality of types from the image array sensor;
means for allocating a zone number for a sequential increase from a signal of a long accumulation time toward a signal of a short accumulation time in order to express the type of accumulation time;
an image memory for storing any one of the long time accumulation signal and the short time accumulation signals of the plurality of types together with the zone number;
first writing control means for writing the zone number as is and writing the long time accumulation signal to the image memory when the long time accumulation signal read from the image array sensor is not saturated, and for writing the zone number as one large value when the long time accumulation signal is saturated; and
second writing control means which compares the zone number of the short time accumulation signal to be written next with the zone number already stored in the image memory, and which writes the short time accumulation signal that is to be written next to the image memory as a new image signal when it is judged that the already stored image signal is saturated, and which does not update the image signal and zone number when it is judged that the already stored image signal is not saturated.

* * * * *